(12) United States Patent
Czymontek et al.

(10) Patent No.: US 8,387,072 B1
(45) Date of Patent: Feb. 26, 2013

(54) TRANSACTIONAL ENVIRONMENTS FOR EVENT AND DATA BINDING HANDLERS

(75) Inventors: Herbert Karl Czymontek, Mountain View, CA (US); Igor Karp, Ismaning (DE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/234,375

(22) Filed: Sep. 16, 2011

(51) Int. Cl.
*G06F 13/00* (2006.01)
(52) U.S. Cl. ........................................ 719/318; 718/106
(58) Field of Classification Search .................. 719/318; 718/106
See application file for complete search history.

(56) References Cited

U.S. PATENT DOCUMENTS

| | | | |
|---|---|---|---|
| 5,680,624 A | 10/1997 | Ross | |
| 6,775,728 B2 | 8/2004 | Zimmer et al. | |
| 7,428,735 B2 | 9/2008 | Nog et al. | |
| 7,752,370 B2 | 7/2010 | Ma | |
| 8,291,436 B2 * | 10/2012 | Avasthi et al. | 719/318 |
| 2005/0050139 A1 | 3/2005 | Creamer et al. | |
| 2006/0136933 A1 * | 6/2006 | Jensen et al. | 719/318 |
| 2012/0254722 A1 * | 10/2012 | Newton et al. | 715/234 |

* cited by examiner

*Primary Examiner* — Andy Ho
(74) *Attorney, Agent, or Firm* — McDonnell Boehnen Hulbert & Berghoff LLP

(57) ABSTRACT

Disclosed are apparatus and methods for executing software applications with an actual environment. Handlers for a software application are registered. Each handler can be executed upon receiving an indication of a triggering event. A determination is made that a triggering event for the software application has occurred. In response to the triggering event: a handler environment for the triggering event is determined based on the actual environment, triggered handlers of the registered handlers are determined to be executed, at least a respective portion of the handler environment is made available to each triggered handler, executing the triggered handlers, where at least one triggered handler updates its respective portion of the handler environment during execution, determining an updated-handler environment based on the handler environment and the portions of the handler environments after execution of the triggered handlers, and updating the actual environment based on the updated-handler environment.

35 Claims, 11 Drawing Sheets

TRANSACTIONAL ENVIRONMENTS FOR EVENT AND DATA BINDING HANDLERS

BACKGROUND

Unless otherwise indicated herein, the materials described in this section are not prior art to the claims in this application and are not admitted to be prior art by inclusion in this section.

Modern operating systems can provide interfaces for application processes and/or sub-processes, such as threads, to be informed of various events. Example events include a key press, a mouse click, expiration of a timer, and a data write operation.

To handle these events, application processes and/or sub-processes can invoke "handlers," or software designed to process the events. Some application processes and/or sub-processes can have one handler, while other application processes and/or sub-processes have multiple handlers.

When a given event occurs, one or more handlers can be invoked by the operating system to process the event. These handlers often are executed asynchronously; that is, without any time ordering.

SUMMARY

In one aspect, a method is provided. One or more handlers are registered for a software application of a computing device. Each of the one or more handlers is configured to be executed upon receiving one or more indications of one or more triggering events. The software application is executed on the computing device using an actual environment of the software application. The computing device determines that a triggering event for the software application has occurred. In response to the triggering event, the computing device: (a) determines a handler environment for the triggering event, where the handler environment is based on the actual environment, (b) determines that one or more triggered handlers of the one or more registered handlers are to be executed, (c) makes available to each individual triggered handler at least a respective portion of the handler environment, (d) executes the one or more triggered handlers, where at least one triggered handler of the one or more triggered handlers updates its respective portion of the handler environment during execution, (e) after executing the one or more triggered handlers, determines an updated-handler environment based on the handler environment and the portions of the handler environments made available to the one or more triggered handlers, and (f) updates the actual environment based on the updated-handler environment.

In a second aspect, a computing device is provided. The computing device includes a processor and data storage. The data storage is configured to store at least computer-readable program instructions. The instructions are configured to, upon execution by the processor, cause the processor to perform functions comprising: (a) registering one or more handlers for a software application, where each of the one or more handlers is configured to be executed upon receiving one or more indications of one or more triggering events, (b) executing the software application using an actual environment of the software application, (c) determining that a triggering event for the software application has occurred, and (d) in response to the triggering event: (i) determine a handler environment for the triggering event, wherein the handler environment is based on the actual environment, (ii) determine that one or more triggered handlers of the one or more registered handlers are to be executed, (iii) make available to each individual triggered handler at least a respective portion of the handler environment, (iv) execute the one or more triggered handlers, wherein at least one triggered handler of the one or more triggered handlers updates its respective portion of the handler environment during execution, (v) after executing the one or more triggered handlers, determine an updated-handler environment based on the handler environment and the portions of the handler environments made available to the one or more triggered handlers, and (vi) update the actual environment based on the updated-handler environment.

In a third aspect, an article of manufacture is provided. The article of manufacture includes a computer-readable storage medium having instructions stored thereon that, in response to execution by a processor, cause the processor to perform functions. The instructions include: (a) instructions for registering one or more handlers for a software application, where each of the one or more handlers is configured to be executed upon receiving one or more indications of one or more triggering events, (b) instructions for executing the software application using an actual environment of the software application, (c) instructions for determining that a triggering event for the software application has occurred, and (d) instructions for, in response to the triggering event: (i) determining a handler environment for the triggering event, wherein the handler environment is based on the actual environment, (ii) determining that one or more triggered handlers of the one or more registered handlers are to be executed, (iii) making available to each individual triggered handler at least a respective portion of the handler environment, (iv) executing the one or more triggered handlers, wherein at least one triggered handler of the one or more triggered handlers updates its respective portion of the handler environment during execution, (v) after executing the one or more triggered handlers, determining an updated-handler environment based on the handler environment and the portions of the handler environments made available to the one or more triggered handlers, and (vi) updating the actual environment based on the updated-handler environment.

DETAILED DESCRIPTION

Overview

Figure 1:
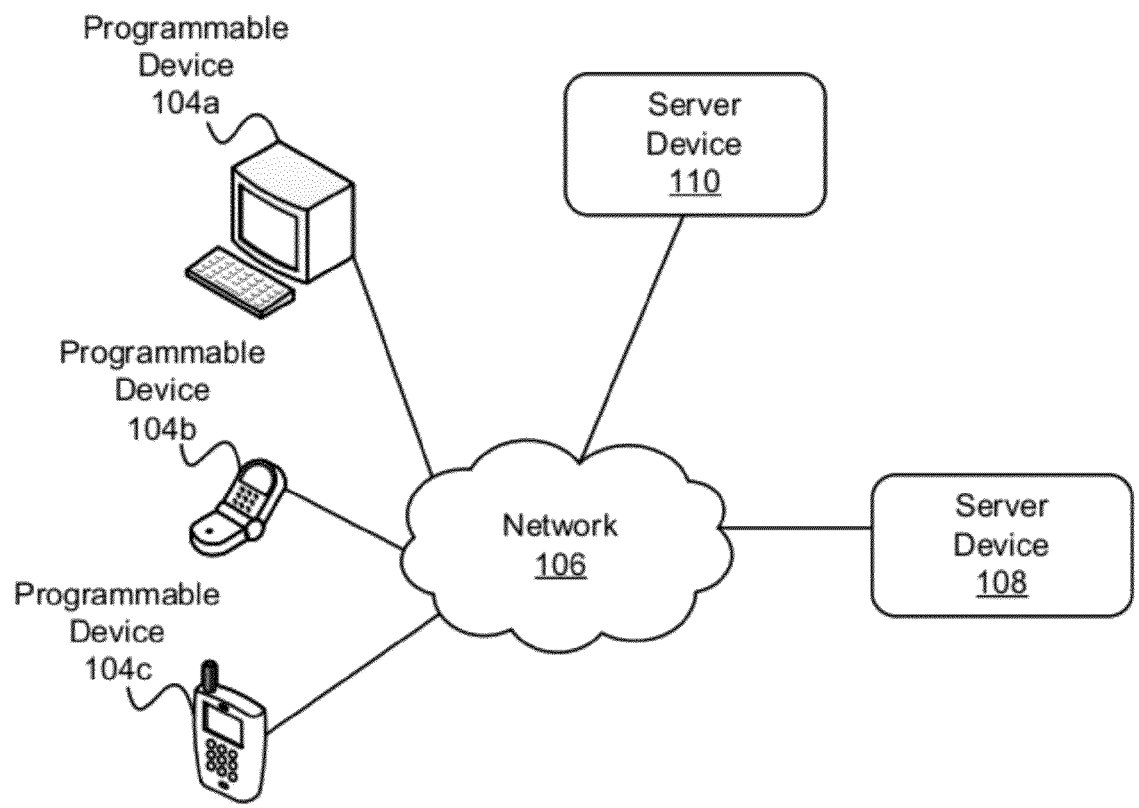
FIG. 1 depicts a distributed computing architecture in accordance with an example embodiment.

Modern computer operating systems, such as the Android operating system used to control smart devices, can provide services for one or more software applications. One of these services involves allowing a software application to create a number of threads, or sub-processes, to perform various sub-tasks of the software application. Each of these threads can have a "handler" that processes messages related to the thread. The threads of the software application can be executed asynchronously, and therefore the handlers can run asynchronously. The operating system can run the software application in an "actual environment", which includes the status of memory locations, and perhaps the status of devices and processors associated with the software application.

Various "triggering events" can occur in operating the smart devices and computers. One type of triggering event is a "device event", or an event associated with part or the entire device, such as a touch pad/keyboard, radio antenna, display, power system, etc. Example device events include, but are not limited to, key presses, mouse movements and clicks, incoming phone calls, outgoing phone calls, power status changes, and display requests. Another type of triggering event is a "data event", or an event associated with reading, writing, updating, and/or deleting one or more data items stored by the device. For example, changing a data value that corresponds to a ring tone can trigger a data event.

In some operating systems, a triggering event can start, or "trigger", execution of multiple handlers on multiple threads. The triggered handlers may not be executed in a specified order. Also, triggering handlers may call each other, have "side effects" that go outside of the scope of the handler—e.g., performing input/output operations and changing global variables—and otherwise interact. As the order of execution of these multiple handlers is not pre-determined and the handlers can interact with each other, debugging software applications that have multiple handlers can be difficult.

To help manage this complexity, a common "handler environment" can be generated before a handler is called. The handler environment can be a partial or complete copy of the actual environment, depending on the size of the environment and the storage capacity of the smart device/computer running the software program.

Each handler can be invoked with its own partial or complete copy of the handler environment. As the handler executes and makes changes to its respective handler environment, the changes can be recorded as a list of transactions; e.g., read variable X, write object Y, etc. As each handler's respective handler environment is separate, the changes made by one handler to its handler environment will not affect a handler environment of another handler executing at the same time. When all handlers have completed executing, the transactions from each handler can be used to reconcile the various handler environments with each other and update the actual environment. After updating the actual environment, the software application can continue execution.

The following example technique can be used to execute handlers:

1. The source code of the handler can be analyzed to find variable references in the handler.

2. The argument lists of the handlers are overwritten to replace external references with references to proxy objects of the same name.

3. The software application is executed.

4. A triggering event occurs to cause invocation of one or more handlers, and so the software application is paused to let the handlers be invoked.

5. Handler environments are created before handler invocation. Each handler environment can include one or more proxy objects with fields that match the names of the properties of the original objects.

6. The proxy objects will then be passed to the handlers as actual arguments for parameters created in step 2.

7. The handlers are invoked and executed.

8. After execution of the handlers, changes in the handler environments are determined, perhaps as transactions, so that the actual environment can be updated.

9. If invoking the handler and/or updating the actual environment causes one or more additional handlers to be executed, return to step 5.

10. The software application execution continues with the updated actual environment.

Using the techniques described herein, handlers triggered by the same triggering event will see the same environment. Also, additional handlers that are "cascaded" or triggered by events after an initial triggering event will be executed only after the handlers triggered by the initial triggering event. Utilizing the procedures described herein, handlers can be executed in a more robust fashion with better data security. Thus, software applications will be executed more reliably, while facilitating the debugging of these software applications. Better data security during the execution of handlers can save both programming time and budget used to debug handlers.

Example Data Network

Turning to the Figures, FIG. 1 shows server devices 108, 110 configured to communicate, via network 106, with programmable devices 104a, 104b, and 104c. Network 106 may correspond to a LAN, a wide area network (WAN), a corporate intranet, the public Internet, or any other type of network configured to provide a communications path between networked computing devices. The network 106 may also correspond to a combination of one or more LANs, WANs, corporate intranets, and/or the public Internet.

Although FIG. 1 only shows three programmable devices, distributed application architectures may serve tens, hundreds, or thousands of programmable devices. Moreover, programmable devices 104a, 104b, and 104c (or any additional programmable devices) may be any sort of computing device, such as an ordinary laptop computer, desktop computer, network terminal, wireless communication device (e.g., a cell phone or smart phone), and so on. In some embodiments, programmable devices 104a, 104b, and 104c may be dedicated to the design and use of software applications. In other embodiments, programmable devices 104a, 104b, and 104c may be general purpose computers that are configured to perform a number of tasks and need not be dedicated to software development tools.

Server devices 108, 110 can be configured to perform one or more services, as requested by programmable devices 104a, 104b, and/or 104c. For example, server device 108 and/or 110 can provide content to programmable devices 104a-104c. The content can include, but is not limited to, web pages, hypertext, scripts, binary data such as compiled software, images, audio, and/or video. The content can include compressed and/or uncompressed content. The content can be encrypted and/or unencrypted. Other types of content are possible as well.

As another example, server device 108 and/or 110 can provide programmable devices 104a-104c with access to software for database, search, computation, graphical, audio, video, World Wide Web/Internet utilization, and/or other functions. Many other examples of server devices are possible as well.

Computing Device Architecture

Figure 2A:
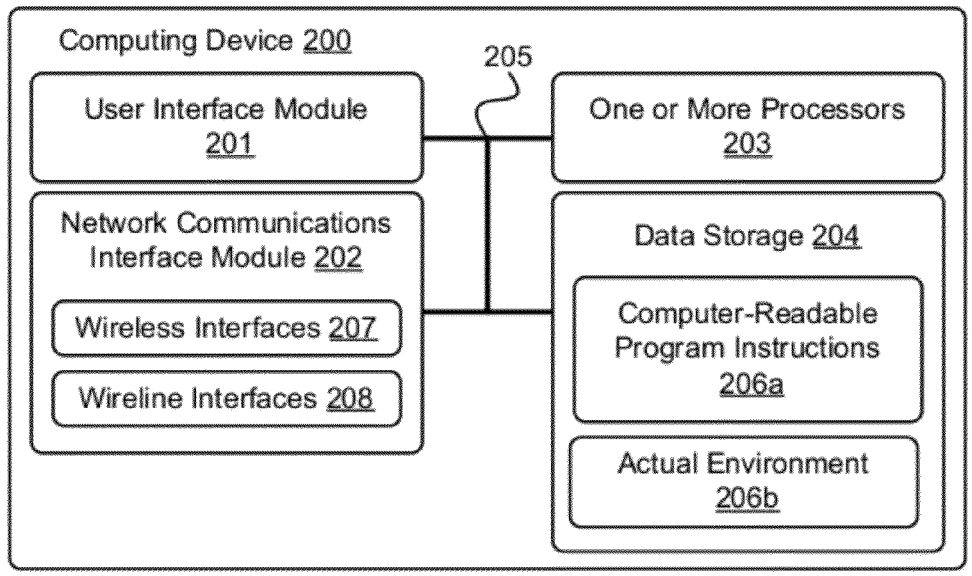
FIG. 2A is a block diagram of a computing device in accordance with an example embodiment.

FIG. 2A is a block diagram of a computing device (e.g., system) in accordance with an example embodiment. In particular, computing device 200 shown in FIG. 2A can be configured to perform one or more functions of server devices 108, 110, network 106, and/or one or more of programmable devices 104a, 104b, and 104c. Computing device 200 may include a user interface module 201, a network-communication interface module 202, one or more processors 203, and data storage 204, all of which may be linked together via a system bus, network, or other connection mechanism 205.

User interface module 201 can be operable to send data to and/or receive data from external user input/output devices. For example, user interface module 201 can be configured to send and/or receive data to and/or from user input devices such as a keyboard, a keypad, a touch screen, a computer mouse, a track ball, a joystick, a camera, a voice recognition module, and/or other similar devices. User interface module 201 can also be configured to provide output to user display devices, such as one or more cathode ray tubes (CRT), liquid crystal displays (LCD), light emitting diodes (LEDs), displays using digital light processing (DLP) technology, printers, light bulbs, and/or other similar devices, either now known or later developed. User interface module 201 can also be configured to generate audible output(s), such as a speaker, speaker jack, audio output port, audio output device, earphones, and/or other similar devices.

Network-communications interface module 202 can include one or more wireless interfaces 207 and/or one or more wireline interfaces 208 that are configurable to communicate via a network, such as network 106 shown in FIG. 1. Wireless interfaces 207 can include one or more wireless transmitters, receivers, and/or transceivers, such as a Bluetooth transceiver, a Zigbee transceiver, a Wi-Fi transceiver, a WiMAX transceiver, and/or other similar type of wireless transceiver configurable to communicate via a wireless network. Wireline interfaces 208 can include one or more wireline transmitters, receivers, and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network.

In some embodiments, network communications interface module 202 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well or in addition to those listed herein to secure (and then decrypt/decode) communications.

Processors 203 can include one or more general purpose processors and/or one or more special purpose processors (e.g., digital signal processors, application specific integrated circuits, etc.). Processors 203 can be configured to execute computer-readable program instructions 206a that are contained in the data storage 204 and/or other instructions as described herein.

Data storage 204 can include one or more computer-readable storage media that can be read and/or accessed by at least one of processors 203. The one or more computer-readable storage media can include volatile and/or non-volatile storage components, such as optical, magnetic, organic or other memory or disc storage, which can be integrated in whole or in part with at least one of processors 203. In some embodiments, data storage 204 can be implemented using a single physical device (e.g., one optical, magnetic, organic or other memory or disc storage unit), while in other embodiments, data storage 204 can be implemented using two or more physical devices.

Data storage 204 can include computer-readable program instructions 206a, actual environment 206b, and perhaps additional data. Actual environment 206b can store at least some of the data used by one or more processes and/or threads of a software application. In some embodiments, data storage 204 can additionally include storage required to perform at least part of the herein-described methods and techniques and/or at least part of the functionality of the herein-described devices and networks.

Cloud-Based Servers

Figure 2B:
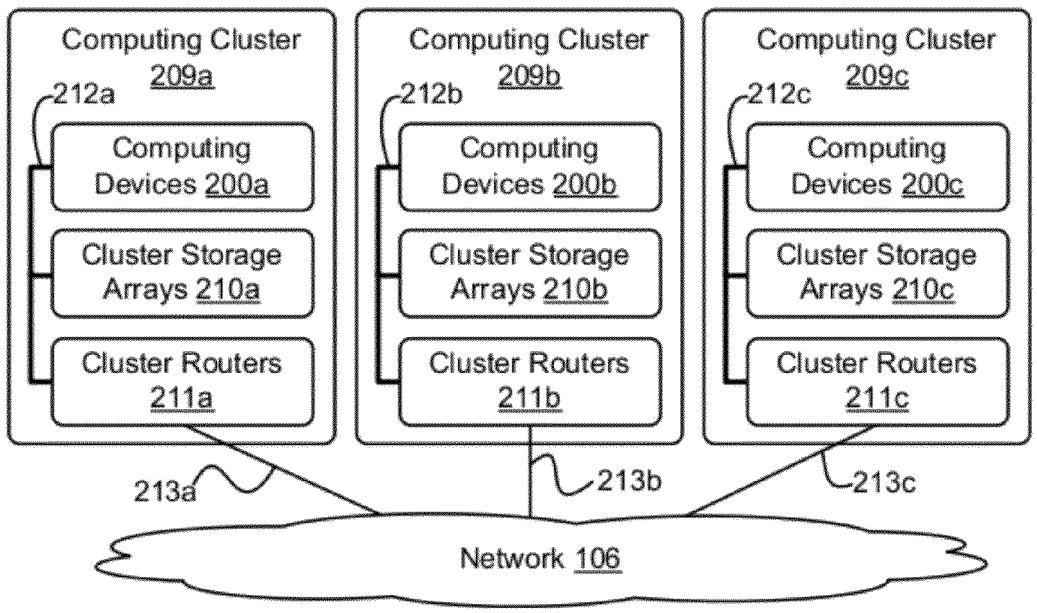
FIG. 2B depicts a cloud-based server system in accordance with an example embodiment.

FIG. 2B depicts a network 106 of computing clusters 209a, 209b, 209c arranged as a cloud-based server system in accordance with an example embodiment. Server devices 108 and/or 110 can be cloud-based devices that store program logic and/or data of cloud-based applications and/or services. In some embodiments, server devices 108 and/or 110 can be a single computing device residing in a single computing center. In other embodiments, server device 108 and/or 110 can include multiple computing devices in a single computing center, or even multiple computing devices located in multiple computing centers located in diverse geographic locations. For example, FIG. 1 depicts each of server devices 108 and 110 residing in different physical locations.

In some embodiments, data and services at server devices 108 and/or 110 can be encoded as computer readable information stored in tangible computer readable media (or computer readable storage media) and accessible by programmable devices 104a, 104b, and 104c, and/or other computing devices. In some embodiments, data at server device 108 and/or 110 can be stored on a single disk drive or other tangible storage media, or can be implemented on multiple disk drives or other tangible storage media located at one or more diverse geographic locations.

FIG. 2B depicts a cloud-based server system in accordance with an example embodiment. In FIG. 2B, the functions of server device 108 and/or 110 can be distributed among three computing clusters 209a, 209b, and 208c. Computing cluster 209a can include one or more computing devices 200a, cluster storage arrays 210a, and cluster routers 211a connected by a local cluster network 212a. Similarly, computing cluster 209b can include one or more computing devices 200b, cluster storage arrays 210b, and cluster routers 211b connected by a local cluster network 212b. Likewise, computing cluster 209c can include one or more computing devices 200c, cluster storage arrays 210c, and cluster routers 211c connected by a local cluster network 212c.

In some embodiments, each of the computing clusters 209a, 209b, and 209c can have an equal number of computing devices, an equal number of cluster storage arrays, and an equal number of cluster routers. In other embodiments, however, each computing cluster can have different numbers of computing devices, different numbers of cluster storage arrays, and different numbers of cluster routers. The number of computing devices, cluster storage arrays, and cluster routers in each computing cluster can depend on the computing task or tasks assigned to each computing cluster.

In computing cluster 209a, for example, computing devices 200a can be configured to perform various computing tasks of electronic communications server 112. In one embodiment, the various functionalities of electronic communications server 112 can be distributed among one or more of computing devices 200a, 200b, and 200c. Computing devices 200b and 200c in computing clusters 209b and 209c can be configured similarly to computing devices 200a in computing cluster 209a. On the other hand, in some embodiments, computing devices 200a, 200b, and 200c can be configured to perform different functions.

In some embodiments, computing tasks and stored data associated with server devices 108 and/or 110 can be distributed across computing devices 200a, 200b, and 200c based at least in part on the processing requirements of server devices 108 and/or 110, the processing capabilities of computing devices 200a, 200b, and 200c, the latency of the network links between the computing devices in each computing cluster and between the computing clusters themselves, and/or other factors that can contribute to the cost, speed, fault-tolerance, resiliency, efficiency, and/or other design goals of the overall system architecture.

The cluster storage arrays 210a, 210b, and 210c of the computing clusters 209a, 209b, and 209c can be data storage arrays that include disk array controllers configured to manage read and write access to groups of hard disk drives. The disk array controllers, alone or in conjunction with their respective computing devices, can also be configured to manage backup or redundant copies of the data stored in the cluster storage arrays to protect against disk drive or other cluster storage array failures and/or network failures that prevent one or more computing devices from accessing one or more cluster storage arrays.

Similar to the manner in which the functions of server devices 108 and/or 110 can be distributed across computing devices 200a, 200b, and 200c of computing clusters 209a, 209b, and 209c, various active portions and/or backup portions of these components can be distributed across cluster storage arrays 210a, 210b, and 210c. For example, some cluster storage arrays can be configured to store the data of server device 108, while other cluster storage arrays can store data of server device 110. Additionally, some cluster storage arrays can be configured to store backup versions of data stored in other cluster storage arrays.

The cluster routers 211a, 211b, and 211c in computing clusters 209a, 209b, and 209c can include networking equipment configured to provide internal and external communications for the computing clusters. For example, the cluster routers 211a in computing cluster 209a can include one or more internet switching and routing devices configured to provide (i) local area network communications between the computing devices 200a and the cluster storage arrays 201a via the local cluster network 212a, and (ii) wide area network communications between the computing cluster 209a and the computing clusters 209b and 209c via the wide area network connection 213a to network 106. Cluster routers 211b and 211c can include network equipment similar to the cluster routers 211a, and cluster routers 211b and 211c can perform similar networking functions for computing clusters 209b and 209b that cluster routers 211a perform for computing cluster 209a.

In some embodiments, the configuration of the cluster routers 211a, 211b, and 211c can be based at least in part on the data communication requirements of the computing devices and cluster storage arrays, the data communications capabilities of the network equipment in the cluster routers 211a, 211b, and 211c, the latency and throughput of local networks 212a, 212b, 212c, the latency, throughput, and cost of wide area network links 213a, 213b, and 213c, and/or other factors that can contribute to the cost, speed, fault-tolerance, resiliency, efficiency and/or other design goals of the moderation system architecture.

Software Application Architecture

Figure 3:
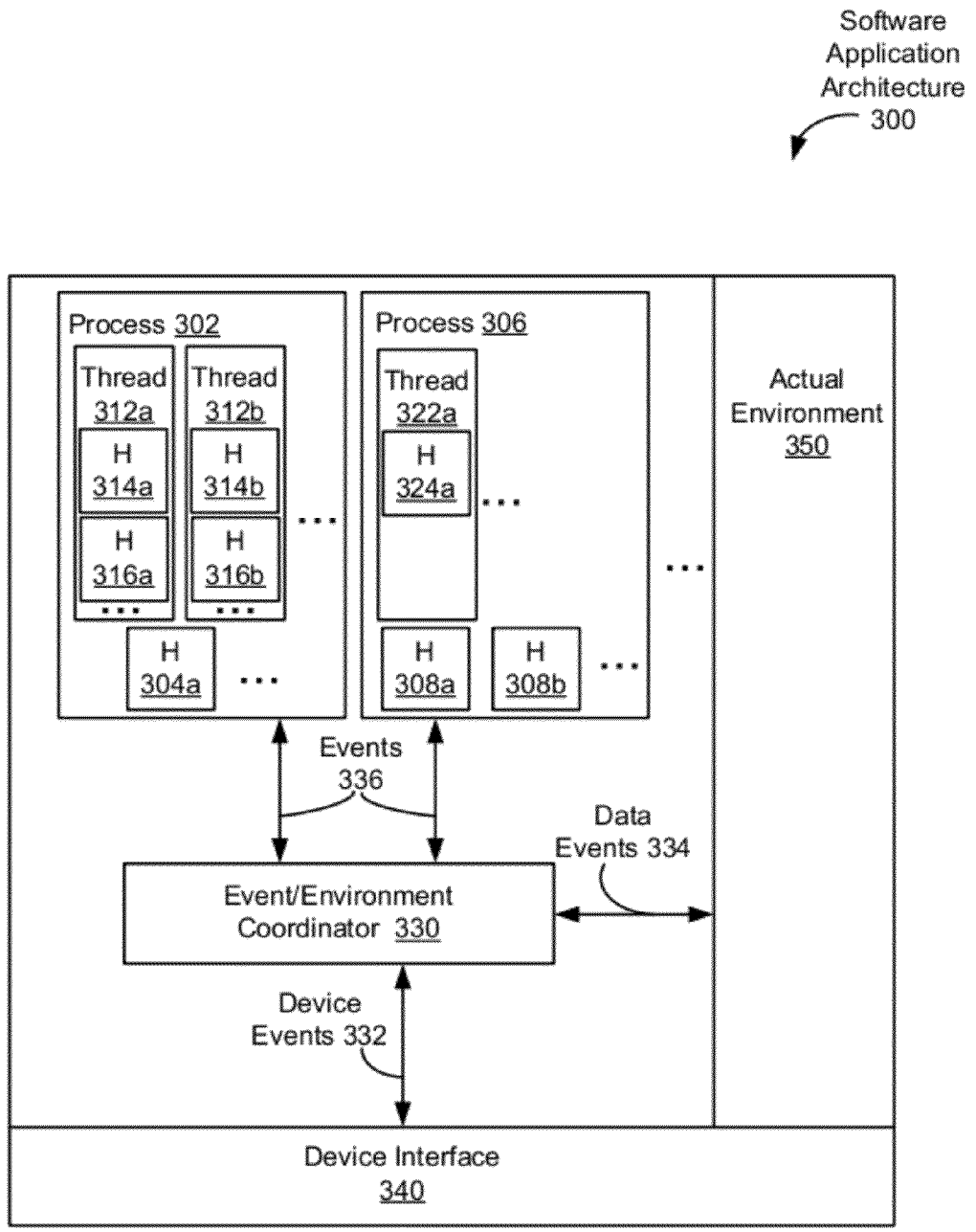
FIG. 3 is a block diagram of a software application architecture, in accordance with an example embodiment.

FIG. 3 is a block diagram of software application architecture 300, in accordance with an example embodiment. In particular, FIG. 3 shows software application architecture 300 that includes processes 302, 306, event/environment coordinator 330, device interface 340, and actual environment 350. Each of processes 302, 306 can perform one or more tasks as required by a software application. Example tasks include, but are not limited to tasks related to data processing, communications, resource management, simulations, modeling, and/or control systems. Many other example tasks are possible as well.

As depicted in FIG. 3, software application architecture 300 can represent one application utilizing two processes or two applications, each utilizing one process. More generally, software application architecture 300 enables execution of a plurality of applications, each application having one or more processes.

FIG. 3 shows process 302 with two threads 312a, 312b and process 306 with one thread 322a. Each thread can be used to perform one or more sub-tasks for an associated process, where the sub-tasks can be related to the task(s) performed by the associated process. In general, software application architecture 300 enables each process to utilize zero or more threads to accomplish task(s). Threads can be created, destroyed, updated, and examined, among other operations.

FIG. 3 indicates that process 302 includes handler (H) 304a, thread 312a includes handlers 314a, 316a and thread 312b includes handlers 314b, 316b, as well as process 306 with two handlers 308a, 308b and thread 322a with handlers 324a. Each handler can be configured to process one or more events, such as events 336 provided by event/environment coordinator 330.

To associate a particular handler with a corresponding event, a thread or process can register a handler with event/environment coordinator 330 to be associated with the corresponding event. Then, upon an occurrence of the corresponding event, event/environment coordinator 330 can execute the registered handler to process the corresponding event for the thread or process. For example, thread 312a can register a handler, such as handler 314a, with event/environment coordinator 330 to be associated with timer expirations. Then, upon expiration of a timer associated with thread 312a, event/environment coordinator 330 can invoke handler 314a to process the timer expiration event.

In some embodiments, an occurrence of a "triggering event" can cause, or trigger, invocation of more than one handler. For example, a triggering event can cause invocation of multiple handlers of a single thread/process or invocation of one or more handlers for a plurality of threads/processes. As another example, the triggering event can cause invocation of one or more handlers, which can generate a "cascade" of one or more additional events. Each of the cascaded events can in turn cause the invocation one or additional handlers, which can in turn cause more cascaded event(s) to be generated.

In embodiments where multiple handlers can be invoked, event/environment coordinator 330 can be configured to ensure that the multiple handlers are executed in a more robust fashion with better data security. As one technique, the source code of the handlers can be modified to ensure data changes occur on copies of environments, rather than changing actual environment 350. For example, source code of the handlers can be scanned and/or parsed to determine parameter, global variable, and/or local variable references. Then, some or all of the parameter, global variable, and/or local variable references in the handler source code can be replaced to refer to respective copies of the parameter(s), global variable(s), and/or local variable(s). The scanning and/or parsing of handler source code to replace references can be performed prior to execution of handler code; e.g., via compilation or pre-processing, and stored. Alternatively, reference replacement can take place during execution; e.g., as part of interpreting or otherwise executing handler code.

Then, event/environment coordinator 330 can ensure that all data accesses, such as reads and writes, performed by an invoked handler are performed on a copy of the actual environment, rather than on actual environment 350. In particular embodiments, event/environment coordinator 330 can generate a partial or complete copy of the actual environment. Upon completion of the invoked handler, event/environment coordinator 330 can compare the copy of the actual environment with actual environment 350 or a pre-invocation copy of actual environment 350 to determine changes made by the invoked handler to actual environment 350.

For example, suppose a handler H1 has the following pseudo code:

TABLE 1

```
private Handler H1 = new Handler(double[ ] A, int *count) {
  // A is assumed to have at least count+1 data items
    int i;
    double val = 0;
    Message Msg = obtainMessage( ); // get message from OS
    for (i = 0; i < *count; i++) {
       val = val + (A[i]*A[i]); // sum of squares for A
    }
    A[*count] = val; // store the sum of squares within A
    *count = *count + 1; // update the count
    Msg.setData(val); // put sum of squares in message
    Msg.sendMessage(H2); // send the message to handler H2
    releaseMesssage(Msg); // return message to OS
}
```

Handler H1 has two parameters: A, which is an array, and count, which is a pointer to an integer. In some implementations, the parameter A is a pointer to an array. The parameter list can be updated to replace references to data items in the actual environment with copies of the data items. For example, suppose event/environment coordinator 330 maintains copies of (a pointer to) A and the pointer to count named CopyA and Copycount, respectively.

Then, the source code and argument lists of H1 can be analyzed to find references to data copied by event/environment coordinator 330; in this case, the analysis can find the parameters A and count of the argument list to H1. These references can be replaced with references to the copied data, respectively CopyA and Copycount. This analysis to find parameter references can be performed via scanning, parsing, and/or during code execution as discussed above.

Table 1 also shows that handler H1 declares three local variables: an integer i, a double precision variable val, and a Message Msg. H1 does not access any global variables. In some embodiments, the source code and argument lists of H1 can be analyzed to find references to globally and/or locally declared variables as well. In these embodiments, copies of some or all of the globally and/or locally variables declared within a handler are copied by event/environment coordinator 330 as well. In these embodiments, event/environment coordinator 330 can generate copies of the globally and/or locally declared variables as well, and replace references to the globally and/or locally declared variables to the copies of the globally and/or locally declared variables. This analysis to find globally and/or locally declared variable references can be performed via scanning, parsing, and/or during code execution as discussed above.

For example, the copies of i, val, and Msg can be referred to as Copyi, Copyval, and CopyMsg, respectively. In these embodiments, the copied locally declared variables can be accessed by a handler as global variables, as one or more additional parameters of the parameter list, or perhaps by some other technique. Also, the portion of handler code that declares the declared variables can then be modified or deleted so not to actually declare any variables.

Table 1AA shows handler H1AA, which is a modified version of handler H1. While H1 does not utilize global variables, H1AA utilizes two global variables: a global array AA that performs the role of the parameter A in handler H1, and a global integer "Invocation_Counter" that tracks the number of invocations of handler H1AA. Handler H1AA has the following pseudo code:

TABLE 1AA

```
global int Invocation_Counter = 0;
global double [ ] AA;
private Handler H1AA = new Handler(int *count) {
  // AA is assumed to have at least count+1 data items
    int i;
    double val = 0;
    Invocation_Counter++; // global variable
    Message Msg = obtainMessage( ); // get message from OS
    for (i = 0; i < *count; i++) {
       val = val + (AA[i]*AA[i]); // sum of squares for AA
    }
    AA[*count] = val; // store the sum of squares within AA
    *count = *count + 1; // update the count
    Msg.setData(val); // put sum of squares in message
    Msg.sendMessage(H2); // send the message to handler H2
    releaseMesssage(Msg); // return message to OS
}
```

In some embodiments, parameters and variable references, both local and global, can be replaced with references to copies of these parameters and variable references. For example, Table 2 shows handler H1 with both parameters in the argument list and variable references replaced with references to data copied by event/environment coordinator 330.

TABLE 2

```
// This is a version of handler H1 that utilizes
// copies of parameters and local variables.
// copies of declared variables now global for this example.
int Copyi;
double Copyval;
Message CopyMsg;
private Handler H1 = new Handler(double[ ] CopyA, int *Copycount)
{
  // A is assumed to have at least count+1 data items
  // comment out variable declarations
  //   int i;
  //   double val = 0;
  // Message Msg = obtainMessage( ); // get message from OS
    // replace variable inits with equivalent global inits
    Copyval = 0;
    CopyMsg = obtainMessage( );
    for (Copyi = 0; Copyi < *Copycount; Copyi++) {
       Copyval = Copyval + (CopyA[i] * CopyA[i]); // sum of
  squares for A
    }
    CopyA[*Copycount] = Copyval; // store the sum of squares
  within A
    *Copycount = *Copycount + 1; // update the count
    CopyMsg.setData(Copyval); // put sum of squares in message
    CopyMsg.sendMessage(H2); // send the message to handler H2
    releaseMesssage(CopyMsg); // return message to OS
}
```

In other embodiments, references to global variables of the actual environment can be replaced with references to copies of the global variables. Table 2AA shows handler H1AA with global variable references replaced with references to data copied by event/environment coordinator 330.

TABLE 2AA

```
// This is a version of handler H1AA with global
// variable references replaced with references to copies of
// the global variables.
// copies of global variables declared globally as well.
global int CopyInvocation_Counter = 0;
global double[ ] CopyAA;
private Handler H1AA = new Handler(int *count) {
    // AA is assumed to have at least count+1 data items
    int i;
    double val = 0;
    // comment out global references
    // Invocation_Counter++; // global variable
    // replace global references with environment references
    CopyInvocation_Counter++;
    Message Msg = obtainMessage( ); // get message from OS
    for (i = 0; i < *count; i++) {
        // val = val + (AA[i]*AA[i]); // sum of squares for AA
        val = val + (CopyAA[i]*CopyAA[i]); // sum of squares
    for AA
    }
    // AA[*count] = val; // store the sum of squares within AA
    CopyAA[*count] = val; // store the sum of squares within AA
    *count = *count + 1; // update the count
    Msg.setData(val); // put sum of squares in message
    Msg.sendMessage(H2); // send the message to handler H2
    releaseMesssage(Msg); // return message to OS
}
```

As a software application with handler H1 or H1AA is executed, a triggering event causes H1 or H1AA to be invoked. Prior to invoking handler H1, event/environment coordinator 330 generates a copy of actual environment 350, including at least, copies of CopyA and Copycount, and copies of variables declared for H1—in this example, Copyi, Copyval, and CopyMsg. Prior to invoking handler H1AA, event/environment coordinator 330 generates a copy of actual environment 350, including at least copies of AA and CopyInvocation_Counter. Then, event/environment coordinator 330 can invoke H1 or H1AA, which in turn will use the respective copies of the declared and/or global variables.

Note that any initializations performed as part of a new global or local variable declaration, such as double val=0, which declares a double precision number val as a new variable and initializes val to 0—can be performed on the respective copies of the declared global or local variables. These lines of the pseudo code of Table 2 perform initializations on the global variable copies of the declared local variables of handler H1 that are equivalent to the initializations performed as part of variable declarations.

// replace variable inits with equivalent global inits
Copyval=0;
CopyMsg=obtainMessage( )

Consequently, H1 executes by operating on the CopyA and Copycount data. After H1 completes, event/environment coordinator 330 can determine the changes made to the CopyA and Copycount data. In this example, this involves the data updates made by the following two lines in the pseudo-code of Table 2:

CopyA[*Copycount]=Copyval; // store the sum of squares within A
*Copycount=*Copycount+1; // update the count Event/environment coordinator 330 can determine that two updates to actual environment 350 need to be made based on execution of H1:

(1) A[*count]=CopyA[*count] and
(2) *count=*Copycount.

In this example, the following two lines of pseudo code in H1 will, upon execution, invoke another handler H2:

CopyMsg.setData(Copyval); // put sum of squares in message
CopyMsg.sendMessage(H2); // send the message to handler H2

Prior to invoking H2, event/environment coordinator 330 can perform the updates to actual environment 350, copy any parameters and/or declared variables used by H2 from actual environment 350 after the updates, and invoke H2 to operate on CopyMsg.

Similarly, handler H1AA executes by operating on the copies of global variables CopyAA that is a copy of the AA array, and CopyInvocation_Counter that is a copy of the Invocation_Counter global integer variable. After H1AA completes, event/environment coordinator 330 can determine the changes made to the CopyAA and CopyInvocation_Counter variables. In this example, this involves the data updates made by the following line in the pseudo-code of Table 2AA:

CopyInvocation_Counter++;

Event/environment coordinator 330 can determine that one update to actual environment 350 needs to be made based on execution of H1AA:

(1) CopyInvocation_Counter++
For each execution of the following loop,
for (i=0; i<*count; i++) {
// val=val+(AA[i]*AA[i]); // sum of squares for AA
val=val+(CopyAA[i]*CopyAA[i]); // sum of squares for AA
} event/environment coordinator 330 can determine that one or perhaps two reads of the CopyAA array with index i are performed. Also, upon execution of the following line of pseudo-code:

CopyAA[*count]=val; // store the sum of squares within AA event/environment coordinator 330 can determine that one write to the CopyAA array array with index *count is performed.

In the H1AA example, the following two lines of pseudo code will, upon execution, invoke another handler H2:

Msg.setData(val); // put sum of squares in message
Msg.sendMessage(H2); // send the message to handler H2

Prior to invoking H2 from handler H1AA, event/environment coordinator 330 can perform the updates to actual environment 350, copy any parameters and/or variables used by H2 from actual environment 350 after the updates, and invoke H2 to operate on Msg.

In some embodiments, actual environment 350 can be updated using atomic transactions; e.g., actual environment 350 can include a database system configured to perform data changes in a deterministic fashion by applying transactions atomically, consistently, durably, and in an isolated fashion. In these embodiments, event/environment coordinator 330 can generate one or more atomic data transactions corresponding to the determined changes, and apply those transactions to actual environment 350.

For example, the data accesses performed by H1 shown in Table 2 on the parameters Copycount and CopyA would include:

1. For each iteration of the "for (Copyi=0; Copyi<*Copycount; Copyi++)" loop, *Copycount may be read once to perform the comparison of Copyi and *Copycount. In some embodiments, after the first read of *Copycount, the value of *Copycount can be stored in a register, cache, or other memory location and/or is optimized to only perform one read of *Copycount to perform all loop iterations.

2. For the loop body, which is the "Copyval=Copyval+ (CopyA[i]*CopyA[i]);" statement, either one or two reads of the CopyA[i] variable are performed. One read of the CopyA

[i] variable may be performed in implementations that store the CopyA[i] value, after the first read, in a register, cache, or other memory location and/or is optimized to only perform one read of CopyA[i], while in other implementations, two reads of the CopyA[i] are required.

3. For the "CopyA[*Copycount]=Copyval" statement, *Copycount is read once and CopyA[*Copycount] is written once.

4. For the "*Copycount=*Copycount+1" statement, *Copycount is read once and then written once.

Assuming no optimizations, the read and write operations when *Copycount=2 performed by H1 may be One read of *Copycount for the comparison when i=0, which succeeds.

Two reads of CopyA[0] in the loop body.

One read of *Copycount for the comparison when i=1, which succeeds.

Two reads of CopyA[1] in the loop body.

One read of *Copycount for the comparison when i=2, which fails as *Copycount=2.

One read of *Copycount and one write of CopyA[2] in the "CopyA[*Copycount]=Copyval" statement.

One read and one write of *Copycount for the "*Copycount=*Copycount+1" statement.

Event/environment coordinator 330 can then convert this series of read and write operations on the copied variables into a list of one or more corresponding transactions on data in the actual environment. For example, the following example transaction list, corresponds to un-optimized transactions performed by handler H1 when *count=2, and thus *Copycount=2:

Read(*count)
Read(A[0])
Read(A[0])
Read(*count)
Read(A[1])
Read(A[1])
Read(*count)
Write(A[*count], *count) // store the value of *count at A[*count]
Read(*count)
Write(*count, *count+1) // store the value of *count+1 at *count As another example, suppose handler H1AA shown in Table 2AA was executed. The data accesses performed by H1AA shown in Table 2AA on the variables CopyInvocation_Counter and CopyAA would include:

1. For the CopyInvocation_Counter++; statement, which is equivalent to the statement CopyInvocation_Counter=CopyInvocation_Counter+1, one read and one write access of the CopyInvocation_Counter variable are required.

2. For each iteration of the "for (i=0; i<*count; i++)" loop, the loop body is executed. In the loop body, which is the "val=val+(CopyAA[i]*CopyAA[i]);" statement, either one or two reads of the CopyAA[i] variable are performed. One read of the CopyAA[i] variable may be performed in implementations that store the CopyAA[i] value, after the first read, in a register, cache, or other memory location and/or is optimized to only perform one read of CopyAA[i], while in other implementations, two reads of CopyAA[i] are required.

3. For the "CopyAA[*count]=val" statement, CopyAA[*count] is written once.

Assuming no optimizations, the read and write operations when *count=2 performed by H1AA may be One read of CopyInvocation_Counter.

One write of CopyInvocation_Counter.

One or two reads of CopyAA[0] in the loop body.

One read of *count for the comparison when i=1, which succeeds.

One or two reads of CopyAA[1] in the loop body.

One read of *count for the comparison when i=2, which fails as *count=2.

One write of CopyAA[2] for the "CopyAA[*count]=val" statement.

Event/environment coordinator 330 can then convert this series of read and write operations on the copied variables into a list of one or more corresponding transactions on data in the actual environment. For example, the following example transaction list, corresponds to un-optimized transactions performed by handler H1AA when *count=2:

Read(CopyInvocation_Counter)
Write(CopyInvocation_Counter, CopyInvocation_Counter+1) // store value of CopyInvocation_Counter+1 as CopyInvocation_Counter
Read(CopyAA[0])
Read(CopyAA[0]))
Read(CopyAA[1])
Read(CopyAA[1])
Write(CopyAA[*count], val) // store the value of val at CopyAA[*count]

These transactions can be performed atomically to read and write data in actual environment 328. The use of atomic transactions ensure each read or write transaction for a given data item completes before any competing write, and perhaps read, transactions for the given data item take place. Many other generated transactions, including examples with transactions involving declared variables, are possible as well.

In other embodiments, event/environment coordinator 330 can track cascaded events and ensure deterministic execution of cascaded events. For example, event/environment coordinator 330 can ensure that a handler for an event, once invoked, runs to completion before processing any events cascading from the handler invocation, such as mentioned above in the example where handler H2 was not invoked until handler H1 had completed.

Any cascaded events can be executed using a deterministic ordering scheme, such as a first-in-first-out (FIFO) scheme, a last-in-first-out (LIFO) scheme, or other deterministic ordering scheme. In some embodiments, each handler invoked on a cascaded event can be executed using a copy of the actual environment as modified by any completed handlers, such as discussed in the example of Tables 1 and 2 above. In other embodiments, the handler invoked on a cascaded event can be executed using a copy of the actual environment prior to any modifications by any completed handlers; e.g., a copy of the "original" actual environment.

In some embodiments, "cycles" of handlers can be executed, detected, reported, and or broken. A cycle of handlers involves a first handler HC1, calling a second handler HC2, and so on, until some handler calls HC1 (or another previously called handler) for a second time. For example, suppose HC1 calls HC2, which in turn calls HC1 again, leading to a calling chain of HC1→HC2→HC1, with a cycle between HC1 and HC2. As another example, suppose HC1 calls HC2, HC2 calls a third handler HC3, which in turn calls a fourth handler HC4, which in turn calls HC2. The corresponding calling chain would be HC1→HC2→HC3→HC4→HC2, and a cycle between HC2→HC3→HC4→HC2.

Cycle-detection algorithms can be used to detect cycles in calling chains. For example, event/environment coordinator 330 or another entity within software application architecture 300 can execute a cycle detection algorithm to detect a cycle of handler calls. Once detected, the cycle of handler calls can be: (a) executed and perhaps ignored as cycles are valid programming constructs, (b) broken by terminating execution of a handler within the cycle of handler calls, and/or (c) reported as being executed or being broken.

In some embodiments, event/environment coordinator 330 can track side effects, such as interactions with input/output devices, allocation/deallocation of shared resources, and modifications to global variables. For example, in some embodiments, the following line of handler H1 of Table 1 calls an "obtainMessage( )" function, which can cause allocation of a shared pool of messages:

CopyMsg=obtainMessage( );

In these embodiments, the analysis to find declared variable references and parameters, can be expanded to include an analysis to find references related to side effects, such as, but not limited to, functions, methods, and/or operators for performing input/output operations and/or shared resource allocation/deallocation and names of global variables. Then, the references related to side effects can be replaced with references to an environment controlled by event/environment coordinator 330.

For example, references to operations for input/output devices can be replaced with operations to virtual devices and/or device queues. That is, the operation to be performed on an actual device can be placed into a queue to be performed along with transactions performed on the environment. In the case of allocation of resources and global variables, event/environment coordinator 330 can either provide resources, such as memory and copies of global variables using an environment copy—e.g., the "obtainMessage( )" function call can be replaced with an function call such as "obtainCopyMessage( )". The obtainCopyMessage( ) function can allocate a message from a copy of the actual environment rather than from actual environment 350.

As another example, global variable references can be processed in a similar fashion to parameter and declared variable accesses. For example, let CURRENT_PROCS track a number of processes (running and idle) that utilize software application architecture 300 in software application architecture 300. Then, a reference to the CURRENT_PROCS variable within a handler, such as H1, can be replaced with a reference to a copy of the global variable maintained by event/environment coordinator 330. Also or instead, a transaction corresponding to the reference to the global variable can be added to the transaction list, and the transaction carried out with the other transactions in the transaction list.

For requests for input/output operations, these requests can be queued until event/environment coordinator 330 determines that operations on actual environment can be performed. In some embodiments, the queued requests can be ordered with operations, such as transactions, performed on actual environment 350.

For example, take the following three lines of H1AA as shown in Table 2AA:

CopyAA[*count]=val; // store the sum of squares within A
*count=*count+1; // update the count
Msg.setData(val); // put sum of squares in message which, when executed, lead to the last transaction in the un-optimized list of transactions shown above:

Write(CopyAA[*count], val) // store the value of val at CopyAA[*count]

Then, suppose these three lines of code were updated as follows:

Print ("AA[count-1]=", CopyAA[*count-1]); //print AA[count-1]

CopyAA[*count]=val; // store the sum of squares within A
*count=*count+1; // update the count
Print("AA[count-1]=", CopyAA[*count-1]); //print AA[count-1]=sum of squares
Msg.setData(val); // put sum of squares in message Then, the last transaction of the un-optimized list shown above which relate to the original three lines of H1AA can be updated to include input/output operations, such as shown in the example below:

Read(CopyAA[*count-1]);) // for the first new print statement
Print("AA[count-1]=", CopyAA[*count-1]);) // carry out the first print statement
Write(CopyAA[*count], val) // previous transaction
Read(CopyAA[*count-1]) // for the second new print statement
Print("count=", CopyAA[*count-1]) // carry out second print statement Many other examples of side effects and techniques for handling side effects are possible as well.

FIG. 3 shows examples of events 336 including device events 332 and data events 334. Device events 332 can be generated in response to information provided about one or more devices via device interface 340, such as information about input/output operations, interrupts, device status reports, and requested information. Other types of information can be provided via device events 332 as well.

Data events 334 can be generated in response to one or more operations performed on one or more specified data items typically stored in and associated with actual environment 350. For example, recall that the CURRENT_PROCS global variable mentioned above tracks a number of processes that utilize software application architecture 300, and for a given process, a data item, PROC_DATA_ITEM, in a table of PROC_DATA_ITEMS is used to store information about the given process. A data event can be generated when CURRENT_PROCS is read or changed, and/or when one or more PROC_DATA_ITEMS are read, updated, deleted, or inserted. Many other examples of device events 332 and/or data events 334 are possible as well.

In some embodiments, events can be generated by a software application. For example, a handler, after processing a message treated as an event, can send one or more messages to other handler(s), which in turn can treat the received message(s) as event(s) and process these events. Many other examples are possible as well.

Figure 4:
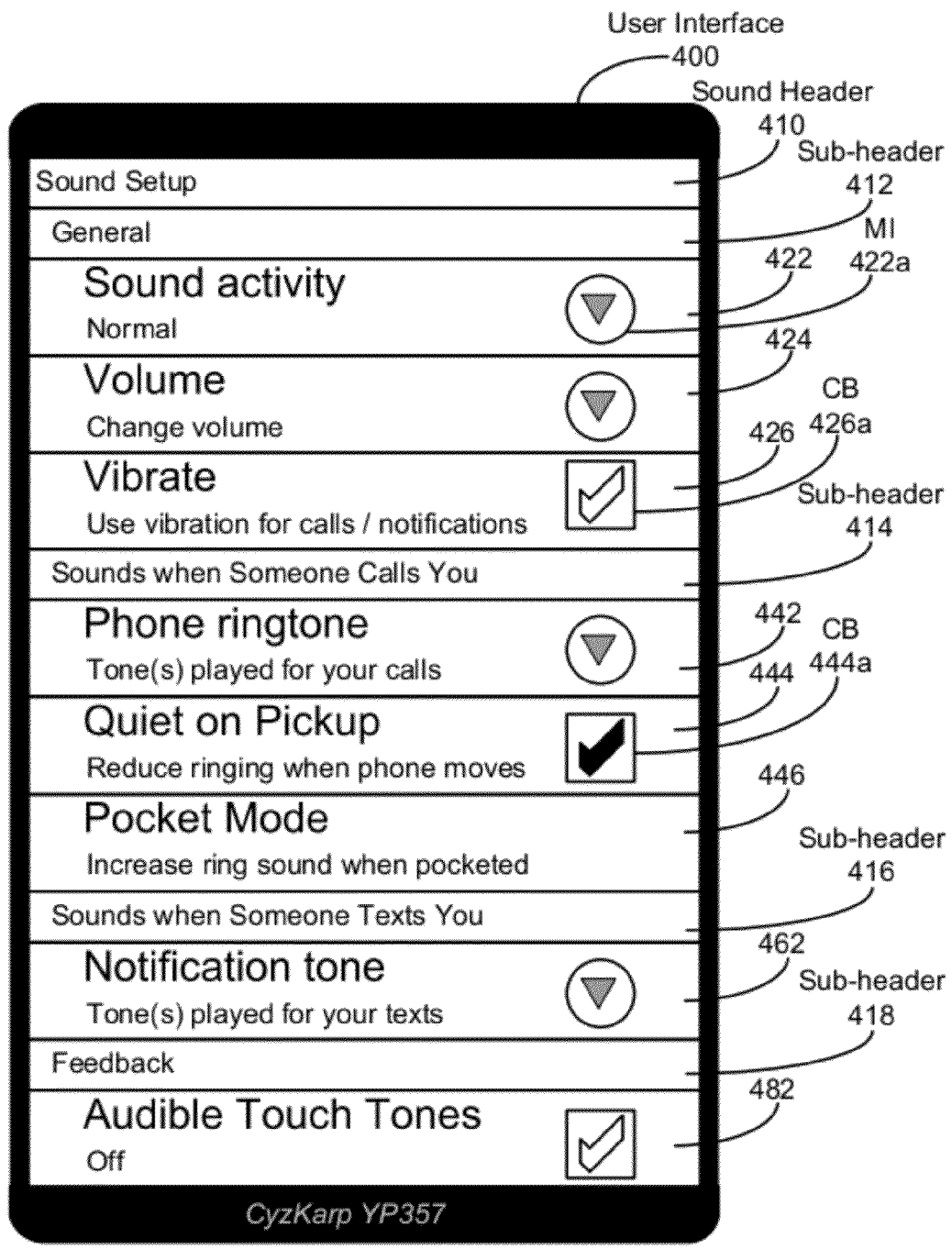
FIG. 4 depicts a user interface for a programmable device, in accordance with an example embodiment.

FIG. 4 depicts user interface 400 for a programmable device, in accordance with an example embodiment. User interface 400 can be generated and used by the programmable device, such as one or more of programmable devices 104a-104c. In some embodiments, user interface 400 can be part of a larger user interface, for example, a user interface configured to permit review, updating, and changing settings for a programmable device, or, more generally, a user interface configured to control the programmable device.

User interface 400 can be displayed on the programmable device and may be updated based on received input; for example, input received via user interface 400. To receive input, user interface 400 can be associated with one or more keyboards, keypads, touch screens, computer mice, track balls, joysticks, cameras, voice recognition modules, and/or other similar devices, such as via user interface module 201. For example, user interface 400 can be displayed on a display of a smart phone, with a touch screen overlaying the display, and can receive inputs as one or more touches of the touch screen.

In this example, user interface 400 is divided by header 410 and sub-headers 412, 414, 416, and 418. FIG. 4 shows that header 410 indicates user interface 400 is for "Sound Setup" with "General" sound-setup items of user interface 400 displayed under sub-header 412. Similarly, FIG. 4 shows that calling-sound sound-setup items are displayed under sub-header 414 of "Sounds when Someone Calls You," and text-sound sound-setup items are displayed under sub-header 416 of "Sounds when Someone Texts You," and "Feedback" sound-setup items are displayed under sub-header 418.

General sound-setup items, as depicted in FIG. 4, include sound activity sound-setup item 422, volume sound-setup item 424, and vibrate sound-setup item 426. Calling-sound sound-setup items, as depicted in FIG. 4, include phone-ringtone sound-setup item 442, quiet-on-pickup sound-setup item 444, and pocket-mode sound-setup item 446. Additionally, FIG. 4 depicts text-sound sound-setup items with notification-tone sound-setup item 462 and feedback sound-setup items with audible-touch-tones sound-setup item 482.

Sound activity sound-setup item 422 includes a menu indicator (MI) 422a, depicted in FIG. 4 as a downward-pointing triangle within a circle. Menu indicator 422a, when activated, can cause user interface 400 to display additional items for sound activity sound-setup item 422, such as different types of sound profiles for possible selection. While not depicted in FIG. 4, additional items can be displayed via an additional dialog, such as a pop-up, and/or as additional sound-setup items.

Vibrate sound-setup item 426 includes a check box (CB) 426a, depicted in FIG. 4 as a white check-mark inside a square, indicate that corresponding vibrate sound-setup item 426 is not selected; i.e., the programmable device will not vibrate for calls or notifications. In contract, check box 444a is shown with a black check-mark inside a square, indicate that corresponding quiet-on-pickup sound-setup item 444 is selected; i.e., ringing volume will be reduces when the programmable device moves.

User interface 400 is just one example of a portion of a user interface that a smart phone, programmable device, and/or computing device can provide using a corresponding software application. Many other examples of user interfaces for smart phones, programmable devices, and/or computing devices are possible as well.

Figure 5A:
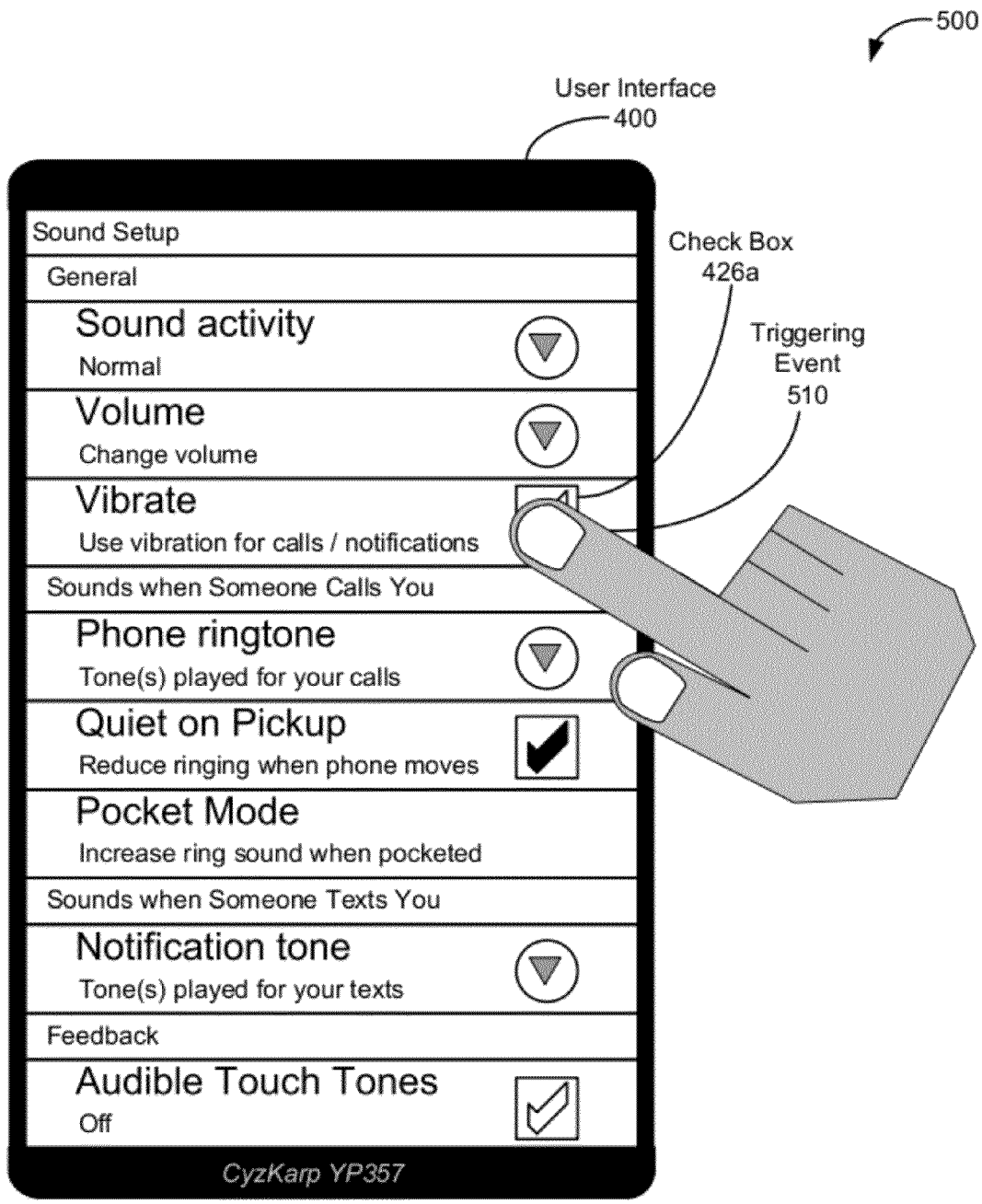
FIGS. 5A-5F depict a handler invocation scenario, in accordance with an example embodiment.

FIGS. 5A-5F depict an example handler invocation scenario 500, in accordance with an example embodiment. FIG. 5A shows that scenario 500 begins with triggering event 510 when a person touches the programmable device on check-box 426a of user interface 400. FIG. 5A shows that check-box 426a with a white check-mark, indicating that corresponding vibrate sound-setup item 426 is not selected.

Figure 5B:
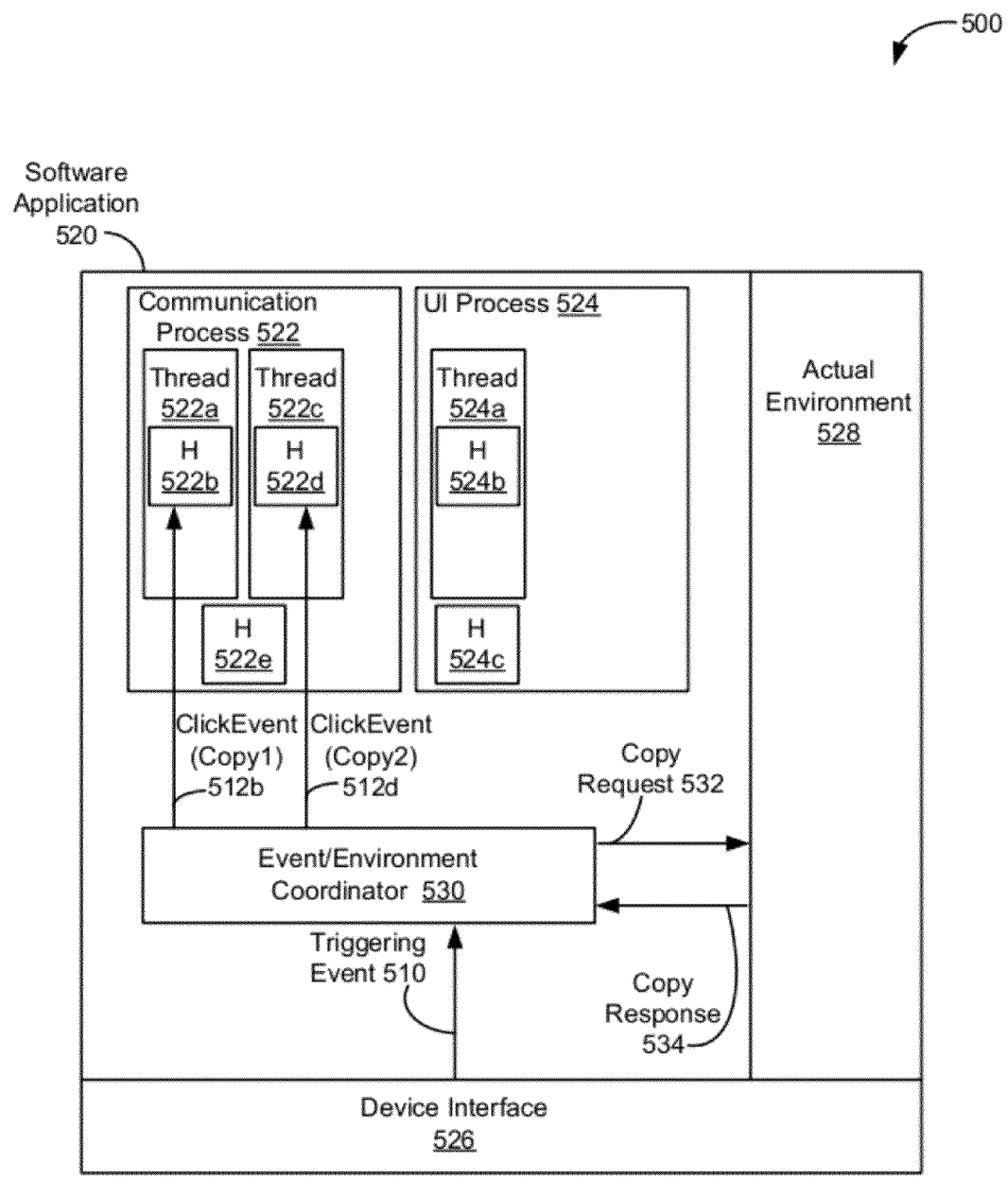

FIG. 5B shows an example software application 520 utilizing software application architecture 300, with processes 522, 524, device interface 526, actual environment 528, and event/environment coordinator 530. Communication process 522 has two threads, 522a and 522c, and a handler H 522e. Thread 522a has a handler 522b and thread 522c has a handler 522d. User interface (UI) process 524 has one thread 524a with one handler 524b, and a handler 524c for user interface process 524.

In scenario 500, thread 522a is utilized by communication process 522 to process telephone calls, and thread 522a uses handler 522b to process events for telephone calls. Similarly, thread 522c is utilized by communication process 522 to process text messages, and thread 522c uses handler 522d to process events for text messages. Also, user interface process 524 administers a user interface that includes user interface 400, and handler 524b is configured to process events for the user interface.

In scenario 500, both communication process 522 and user interface process 524 have registered handlers. In particular, thread 522a has registered handler 522b to handle click events, thread 522c has registered handler 522d to handle click events, and thread 524a has registered handler 524b to handle data events. Also, the source code of all handlers utilized in scenario 500 have been updated to operate on copies of parameters and declared variables, such as discussed above in the context of FIG. 3.

Triggering event 510 can be detected via a touch screen or similar device. As such, triggering event 510 can be generated by device interface 526 related to the touch screen. Upon reception of triggering event 510, event/environment coordinator 530 can determine that two handlers—handlers 522b and 522d—are registered to process triggering event 510 as a click event.

Event/environment coordinator 530 can generate copy request 532 for copies of part or all of actual environment 528. In some embodiments, only one copy is used for all handlers, while in other embodiments, a separate copy is made for each handler to be invoked. In particular embodiments where separate copies are made, each copy is the same, such as when a copy of the entire actual environment 528 is provided to the handler; while in other embodiments, each copy can differ depending on the handler, such as providing a copy of all data referenced directly by the given handler.

In response, event/environment coordinator 530 receives copy response 534 with the requested copies of actual environment 528. In some embodiments, a separate copy request can be provided to actual environment 528 for each copy. In other embodiments, event/environment coordinator 530 includes the functionality to perform copies of actual environment 528 directly; e.g., without use of copy request 532 or copy response 534.

Event/environment coordinator 530 can generate two copies of the click event, shown in FIG. 5B as respective click events 512b and 512d. Click event 512b has includes Copy1, which is a copy of actual environment 528, and click event 512b includes a separate copy, Copy2, of actual environment 528. Upon reception of click event 512b, thread 522a can invoke handler 522b to process click event 512b. Similarly, upon reception of click event 512d, thread 522c can invoke handler 522d to process click event 512d. In some embodiments, only one of handlers 522b and 522d is invoked at one time, while in other embodiments, multiple handlers are invoked and executed simultaneously, perhaps with each handler operating on their own copy of actual environment 528. In all embodiments, handlers 522b and 522d are executed deterministically.

Figure 5C:
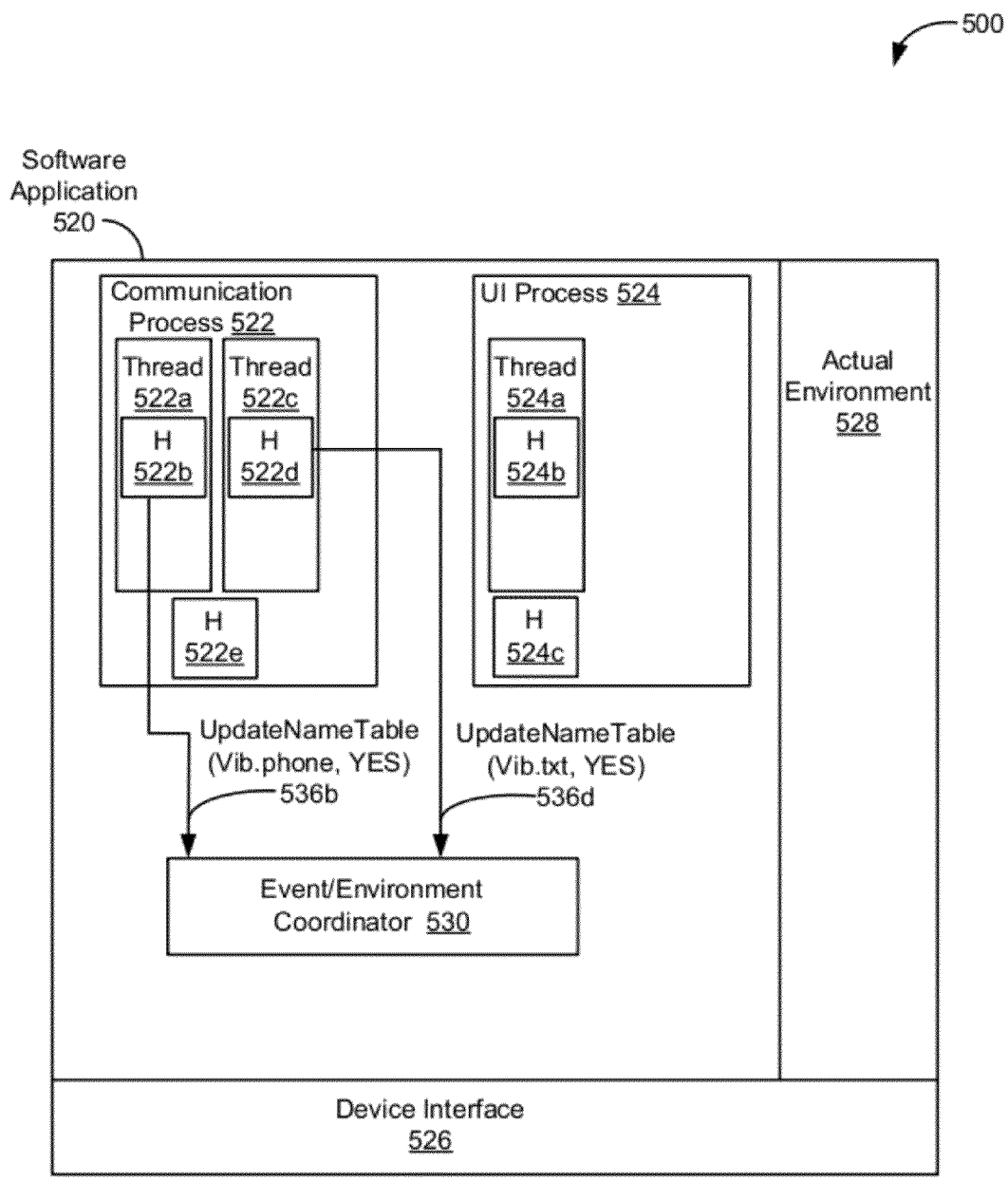

FIG. 5C shows that scenario 500 continues with handler 522b processing click event 510, in part, by sending message 536b to update a "Vib.phone" value of a name table to "YES." Similarly, handler 522d processes click event 510, in part, by sending message 536d to update the "Vib.txt" value of the name table to "YES."

Figure 5D:
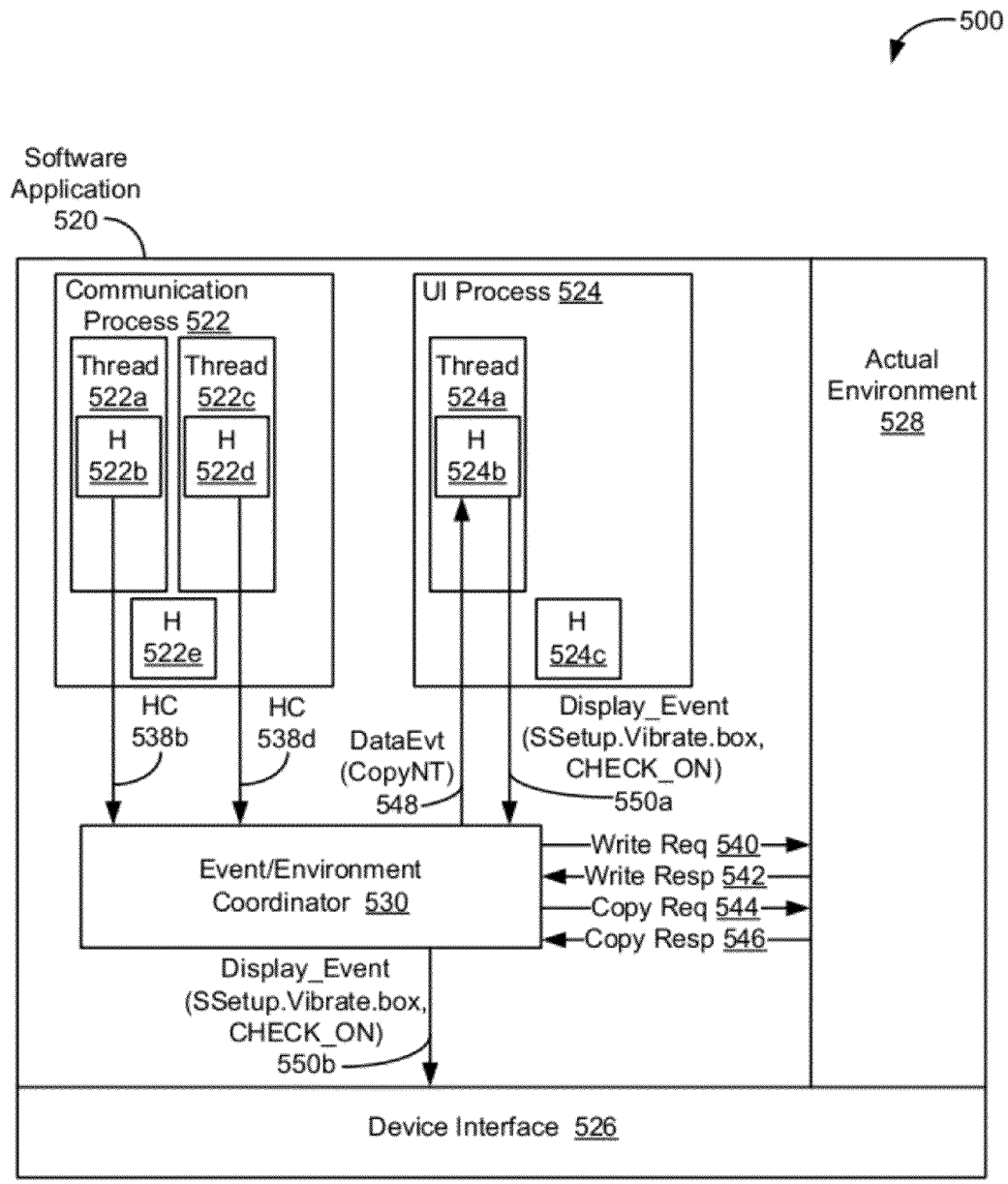

FIG. 5D shows that scenario 500 proceeds with handler 522b sending handler complete (HC) message 538b to event/environment coordinator 530, and handler 522d sending handler complete message 538d to event/environment coordinator 530. In response, event/environment coordinator 530 generates write request 540 to update actual environment 528 to at least update the Vib.phone and Vib.txt values of the name table as respectively indicated by handlers 522b and 522d.

In response, actual environment 528 sends write response 542 indicating that actual environment 528 has been updated with at least the values for Vib.phone and Vib.txt for the name table. In scenario 500, handler 524b is registered to process data events when the name table has been changed. Therefore, in response to write response 542, event/environment coordinator 530 generates a data event 548 ("DataEvt" as shown in FIG. 5D) and sends data event 548 with a copy of the name table ("CopyNT" as shown in FIG. 5D) to handler 524b. In some embodiments, the name table can be an object, and the copy of the name table can be a copy of the object. In still other embodiments, event/environment coordinator 530 can make a copy of the name table and provide a pointer to the copy of the name table in data event 548.

The copy made by event/environment coordinator 530 can be a shallow copy or a deep copy. For example, suppose that the name table is an object, defined using the pseudo code of Table 3 below:

TABLE 3

```
Public class NameTable {
    int NumEntries;
    NameEntry data[ ];
    Public class NameEntry {
        String name;
        String type;
        String str_val;
        int int_val;
        void init( ) {
            name = "";
            type = "";
            str_val = "";
            int_val = 0;
        }
        int get_int_val( ) {
            if (type == "INT")
                return (int_val);
            else
                return (–1);
        }
        String get_string val( ) {
            if (type == "STRING")
                return (str_val);
            else
                return (NULL);
        }
    } // end of class NameEntry
    // create a table of size num_ent
    void CreateEntries(int num_ent) {
        int i;
        int datasize = sizeof(NameEntry) * num_ent;
        // allocate data for the table
        data = (NameEntry [ ]) allocate(datasize);
        if (data == NULL) // if fail
            exit( ); // quit
        // here only if successfully allocated table
        num_entries = num_ent;
        // initialize each new entry
        for (i = 0; i < num_entries; i++)
            data[i].init( );
    }
    // do a shallow copy of the instant object to p
    void ShallowCopy(NameTable *p)
    {
        p->num_entries = num_entries;
        p->data = data;
    }
    // do a deep copy of the instant object to p
    void DeepCopy(NameTable *p)
    {
        // calculate size of new data array
        int i, datasize = sizeof(NameEntry) * num_entries;
        // allocate storage for the copy of the name table.
        p->data = (NameEntry [ ]) allocate(datasize);
        // if allocation unsuccessful, exit
```

TABLE 3-continued

```
        if (p->data == NULL)
            exit( );
        // copy data
        p->num_entries = num_entries;
        // copy each DataEntry into the allocated storage
        for (i = 0; i < p->num entries; i++)
        {
            p->data[i].name = data[i].name;
            p->data[i].type = data[i].type;
            p->data[i].str_val = data[i].str_val;
            p->data[i].int_val = data[i].int_val;
        }
    }
    // additional operations for the NameTable...
}
```

As indicated by the pseudo code of Table 3, a shallow copy copies all items at a top level of an object (or data structure), but does not make copies of objects below the top level. In contrast, a deep copy makes copies of all levels of the object (or data structure). For examples, Table 3 shows that at the top level, a NameTable is defined with two variables: num_entries, which is an integer, and data, which is an array of type NameEntry. Table 3 shows that a shallow copy of a NameTable, as indicated by the ShallowCopy(p) method of class NameTable in Table 3, includes copying the num_entries and data values alone.

Continuing this example, Table 3 also shows that a deep copy of a NameTable, as indicated by the DeepCopy(p) method of class NameTable in Table 3, includes first allocating space for a copy of the data array. If the allocation is unsuccessful, then DeepCopy(p) exits. Otherwise, DeepCopy(p) sets the num_entries value of p to the value of the copied object's num_entries value. Then, DeepCopy(p) copies each of the NameEntry data items from the copied object's data array to p's data array.

In some embodiments, the NameEntry class can include one or more references to NameTable values to represent an object hierarchy. In those embodiments, DeepCopy can be modified to operate recursively. In these embodiments, DeepCopy can include functionality to detect and/or break cycles in the object hierarchy for implementations where cycles are allowed in the object hierarchy.

In response to data event 548, handler 524b reviews the copy of the name table. Based on the updated Vib.phone and Vib.txt values in the name table, handler 524b can determine that check box 426a for vibrate sound-setup item 426 on user interface 400 should have black check mark to show that vibrate sound-setup item 426 is on.

In response to this determination, handler 524b can generate display event 550a to mark an "SSetup.vibrate.box" based on a "CHECK_ON" value; that is, handler 524b uses display event 550a to instruct a display to change check box 426a to show a black check mark. Event/environment coordinator 530 then provides display event 550b to device interface 526. In some embodiments, display event 550b is a copy of display event 550a; while in other embodiments, display event 550b is generated by event/environment coordinator 530 based on processing and perhaps modifying display event 550a.

Figure 5E:
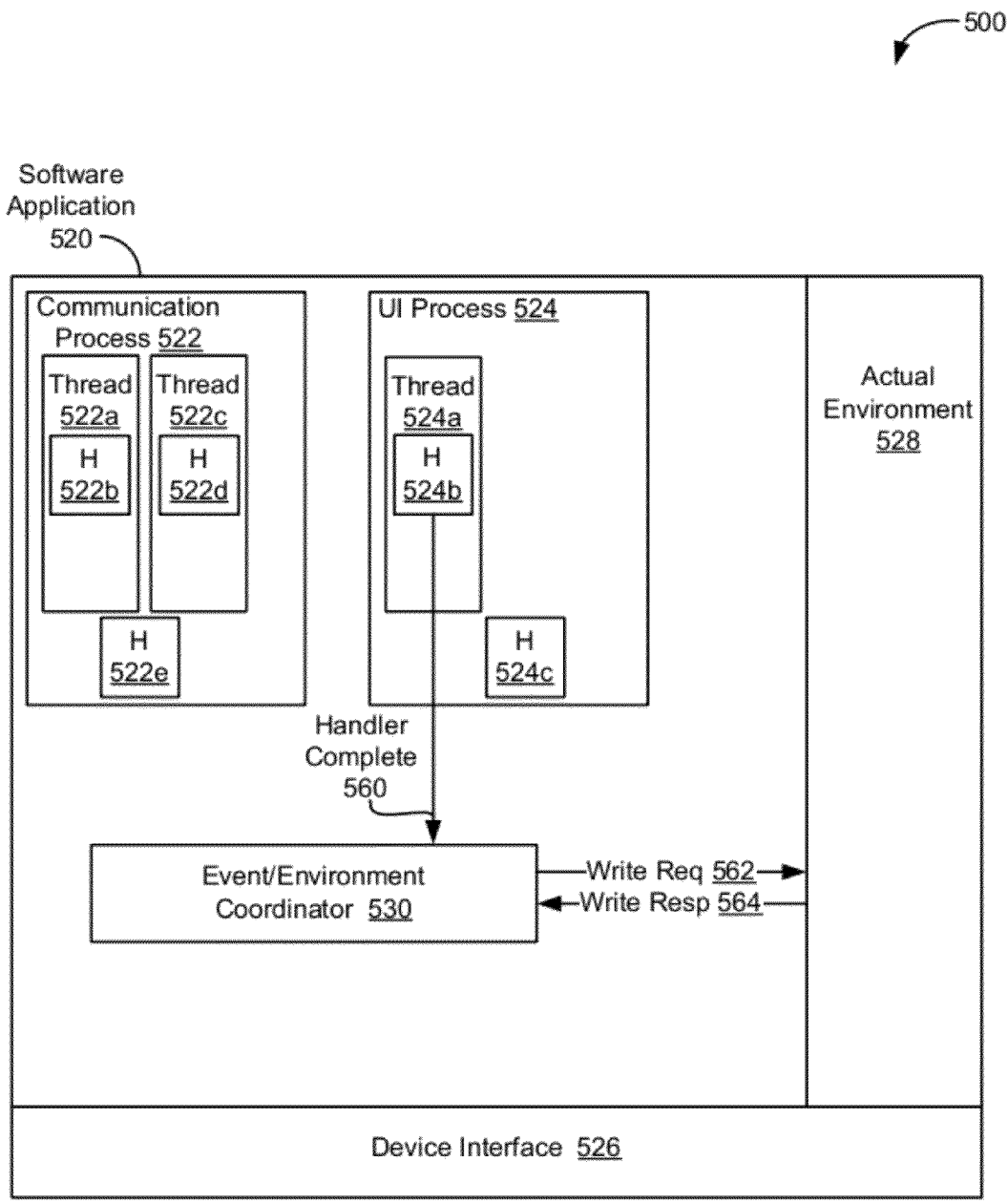

As shown in FIG. 5E, scenario 500 continues with handler 524b sending handler complete message 560 to indicate to event/environment coordinator 530 completion of handler 524b. In response, event/environment coordinator 530 can send write request 562 to actual environment 528 to perform data changes made by handler 524b during invocation. Actual environment can responsively send write response 564 when actual environment 528 has completed making the data changes indicated by write request 562.

Figure 5F:
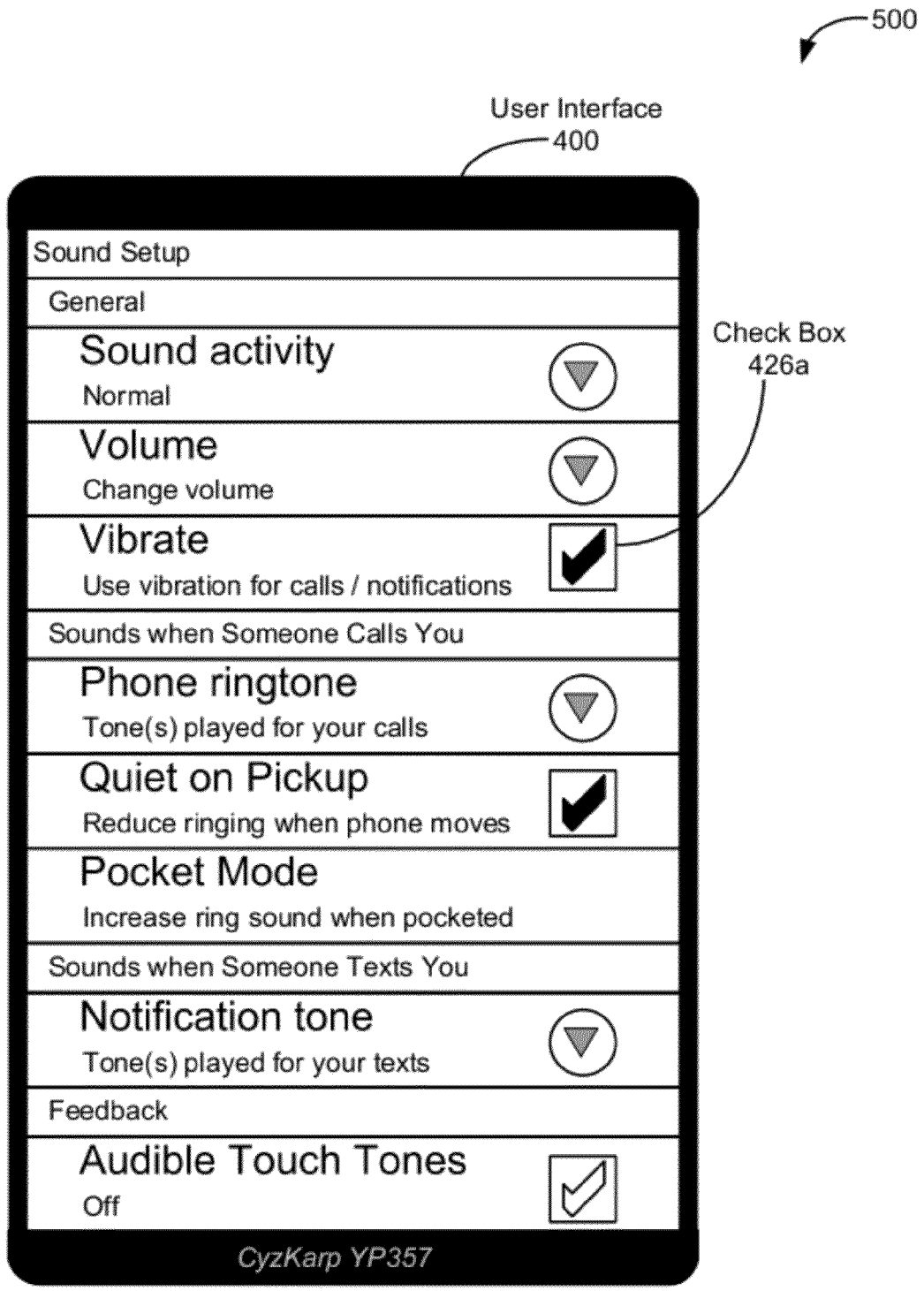

FIG. 5F shows check-box 426a with a black check-mark, indicating that corresponding vibrate sound-setup item 426 is selected in response to triggering event 510 and that check box 426a has a black check mark in response to display event 550b. In some scenarios, software application 520 continues executing after performing the activities of scenario 500. Many other scenarios are possible as well, with more or fewer events, handlers, threads and/or processes than indicated in scenario 500.

Example Operations

Figure 6:
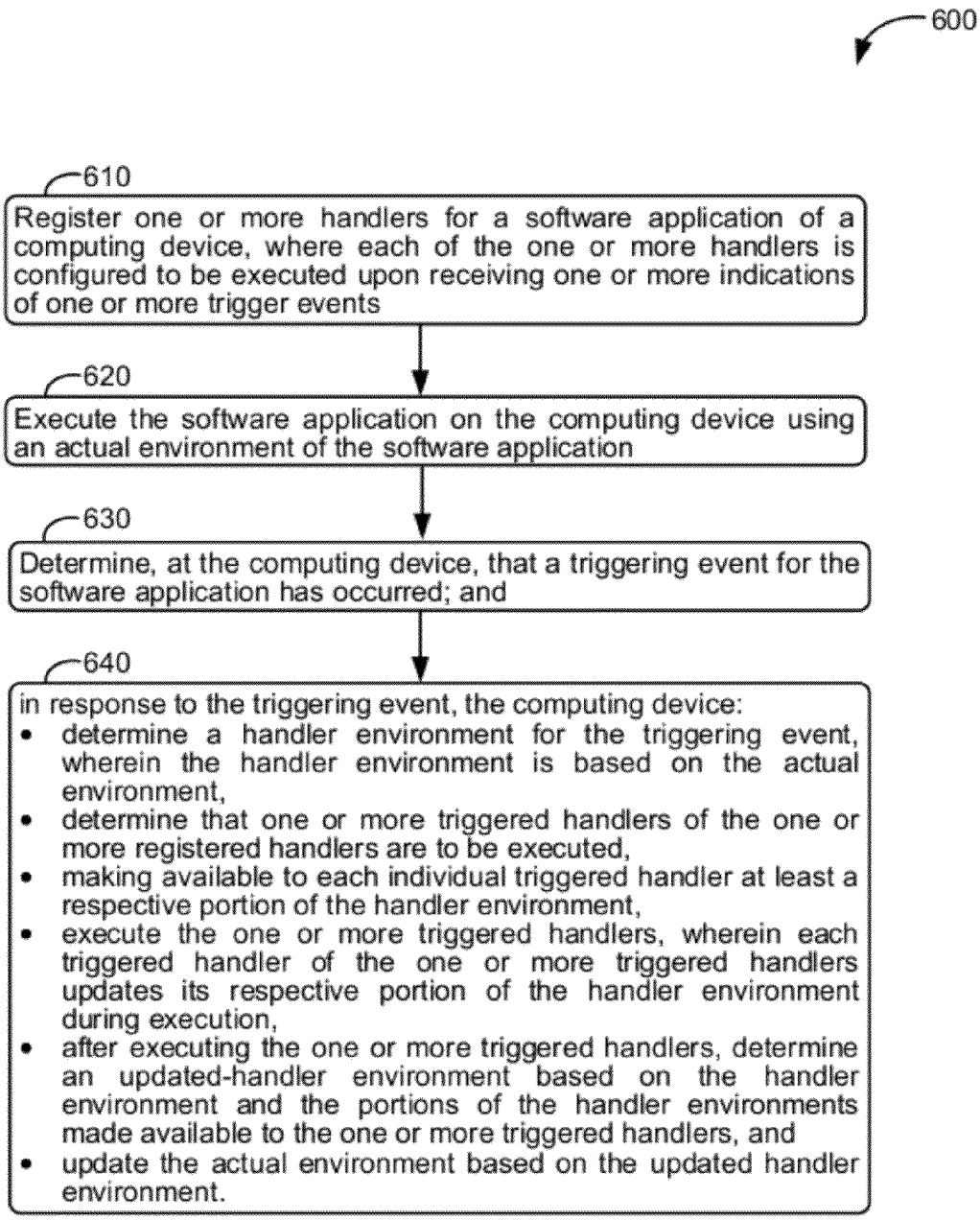
FIG. 6 is a flow chart of a method, in accordance with an example embodiment.

FIG. 6 is a flow chart of method 600, in accordance with an example embodiment. Method 600 begins at block 610, where one or more handlers for a software application of a computing device are registered. Each of the one or more handlers can be configured to be executed upon receiving one or more indications of one or more triggering events, such as discussed above in the context of at least FIGS. 3-5F.

At block 620, the software application can be executed on the computing device. The software application can be executed using an actual environment, such as discussed above in the context of at least FIGS. 3-5F.

At block 630, the computing device can determine that a triggering event for the software application has occurred, such as discussed above in the context of at least FIGS. 3-5F.

At block 640, the computing device can, in response to the triggering event: (a) determine a handler environment for the triggering event, wherein the handler environment is based on the actual environment, (b) determine that one or more triggered handlers of the one or more registered handlers are to be executed, (c) provide at least a portion of the handler environment to each of the one or more triggered handlers, (d) execute the one or more triggered handlers, where at least one triggered handler of the one or more triggered handlers updates the portion of the handler environment during execution, (e) after executing the one or more triggered handlers, determining an updated-handler environment based on the handler environment and the portions of the handler environments of one or more triggered handlers, and (f) update the actual environment based on the updated-handler environment. The procedures of block 640 are discussed above in more detail at least in the context of FIGS. 3 and 5A-5F.

In some embodiments, the handler environment includes a partial copy of the actual environment, such as discussed above in more detail at least in the context of FIGS. 3 and 5A-5F. In other embodiments, the handler environment includes a complete copy of the actual environment, such as discussed above in more detail at least in the context of FIGS. 3 and 5A-5F.

In still other embodiments, the portion of the handler environment includes a copy of an object of the actual environment. In particular of the still other embodiments, the copy of the object includes a shallow copy of the object; while in even other embodiments, the copy of the object includes a deep copy of the object. Copying objects is discussed above in more detail at least in the context of at least FIGS. 3 and 5A-5F.

In yet other embodiments, executing the one or more triggered handlers includes generating one or more transactions to be performed on an environment based on an execution of a triggered handler of the one or more triggered handlers. In particular of the yet other embodiments, the one or more transactions comprise at least one atomic transaction. In other particular of the yet other embodiments, updating the actual environment includes performing the one or more transactions on the actual environment. Generating transactions, including atomic transactions, which can be performed on the actual environment, is discussed above in more detail at least in the context of at least FIG. 3.

In even other embodiments, executing the one or more triggered handlers includes executing a cycle of two or more triggered handlers. In particular of the even other embodiments, the cycle of two or more triggered handlers can be detected and reported. In other particular of the even other embodiments, executing a cycle of two or more triggered handlers includes breaking the cycle of two or more triggered handlers. Executing, detecting, reporting, and breaking cycles of triggered handlers is discussed above in more detail at least in the context of at least FIG. 3.

In some embodiments, method 600 additionally includes continuing execution of the software application using the updated actual environment, such as discussed above in the context of at least FIG. 5F.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method, comprising:
registering one or more handlers for a software application of a computing device, wherein each of the one or more handlers is configured to be executed upon receiving one or more indications of one or more triggering events;
executing the software application on the computing device using an actual environment of the software application;
determining, at the computing device, that a triggering event for the software application has occurred; and
in response to the triggering event, the computing device:
determining a handler environment for the triggering event, wherein the handler environment is based on the actual environment,
determining that one or more triggered handlers of the one or more registered handlers are to be executed,
making available to each individual triggered handler at least a respective portion of the handler environment,
executing the one or more triggered handlers, wherein at least one triggered handler of the one or more triggered handlers updates its respective portion of the handler environment during execution,
after executing the one or more triggered handlers, determining an updated-handler environment based on the handler environment and the portions of the handler environments made available to the one or more triggered handlers, and
updating the actual environment based on the updated-handler environment.

2. The method of claim 1, further comprising:
continuing execution of the software application using the updated actual environment.

3. The method of claim 1, wherein the handler environment comprises a partial copy of the actual environment.

4. The method of claim 1, wherein the handler environment comprises a complete copy of the actual environment.

5. The method of claim 1, wherein the portion of the handler environment comprises a copy of an object of the actual environment.

6. The method of claim 5, wherein the copy of the object comprises a shallow copy of the object.

7. The method of claim 5, wherein the copy of the object comprises a deep copy of the object.

8. The method of claim 1, wherein executing the one or more triggered handlers comprises: generating one or more transactions to be performed on an environment based on an execution of a triggered handler of the one or more triggered handlers.

9. The method of claim 8, wherein the one or more transactions comprise at least one atomic transaction.

10. The method of claim 8, wherein updating the actual environment comprises performing the one or more transactions on the actual environment.

11. The method of claim 1, wherein executing the one or more triggered handlers comprises executing a cycle of two or more triggered handlers.

12. The method of claim 11, wherein the cycle of two or more triggered handlers is detected and reported.

13. The method of claim 11, wherein executing a cycle of two or more triggered handlers comprises breaking the cycle of two or more triggered handlers.

14. A computing device, comprising:
a processor; and
data storage, configured to store at least computer-readable program instructions, wherein the instructions are configured to, upon execution by the processor, cause the processor to perform functions comprising:
registering one or more handlers for a software application, wherein each of the one or more handlers is configured to be executed upon receiving one or more indications of one or more triggering events;
executing the software application using an actual environment of the software application;
determining that a triggering event for the software application has occurred; and
in response to the triggering event:
determining a handler environment for the triggering event, wherein the handler environment is based on the actual environment,
determining that one or more triggered handlers of the one or more registered handlers are to be executed,
making available to each individual triggered handler at least a respective portion of the handler environment,
executing the one or more triggered handlers, wherein at least one triggered handler of the one or more triggered handlers updates its respective portion of the handler environment during execution,
after executing the one or more triggered handlers, determining an updated-handler environment based on the handler environment and the portions of the handler environments made available to the one or more triggered handlers, and
updating the actual environment based on the updated-handler environment.

15. The computing device of claim 14, wherein the functions further comprise:
continuing execution of the software application using the updated actual environment.

16. The computing device of claim 14, wherein the handler environment comprises a partial copy of the actual environment.

17. The computing device of claim 14, wherein the handler environment comprises a complete copy of the actual environment.

18. The computing device of claim 14, wherein the portion of the handler environment comprises a copy of an object of the actual environment.

19. The computing device of claim 14, wherein executing the one or more triggered handlers comprises: generating one or more transactions to be performed on an environment based on an execution of a triggered handler of the one or more triggered handlers.

20. The computing device of claim 19, wherein the one or more transactions comprise at least one atomic transaction.

21. The computing device of claim 19, wherein updating the actual environment comprises performing the one or more transactions on the actual environment.

22. The computing device of claim 14, wherein executing the one or more triggered handlers comprises executing a cycle of two or more triggered handlers.

23. The computing device of claim 22, wherein the cycle of two or more triggered handlers is detected and reported.

24. The computing device of claim 22, wherein executing a cycle of two or more triggered handlers comprises breaking the cycle of two or more triggered handlers.

25. An article of manufacture including a computer-readable storage medium having instructions stored thereon that, in response to execution by a processor, cause the processor to perform functions, the instructions comprising:
  instructions for registering one or more handlers for a software application, wherein each of the one or more handlers is configured to be executed upon receiving one or more indications of one or more triggering events;
  instructions for executing the software application using an actual environment of the software application;
  instructions for determining that a triggering event for the software application has occurred; and
  instructions for, in response to the triggering event:
    determining a handler environment for the triggering event, wherein the handler environment is based on the actual environment,
    determining that one or more triggered handlers of the one or more registered handlers are to be executed,
    making available to each individual triggered handler at least a respective portion of the handler environment,
    executing the one or more triggered handlers, wherein at least one triggered handler of the one or more triggered handlers updates its respective portion of the handler environment during execution,
    after executing the one or more triggered handlers, determining an updated-handler environment based on the handler environment and the portions of the handler environments made available to the one or more triggered handlers, and
    updating the actual environment based on the updated-handler environment.

26. The article of manufacture of claim 25, wherein the instructions further comprise:
  instructions for continuing execution of the software application using the updated actual environment.

27. The article of manufacture of claim 25, wherein the handler environment comprises a partial copy of the actual environment.

28. The article of manufacture of claim 25, wherein the handler environment comprises a complete copy of the actual environment.

29. The article of manufacture of claim 25, wherein the portion of the handler environment comprises a copy of an object of the actual environment.

30. The article of manufacture of claim 25, wherein the instructions for executing the one or more triggered handlers comprise:
  instructions for generating one or more transactions to be performed on an environment based on an execution of a triggered handler of the one or more triggered handlers.

31. The article of manufacture of claim 30, wherein the one or more transactions comprise at least one atomic transaction.

32. The article of manufacture of claim 30, wherein the instructions for updating the actual environment comprise instructions for performing the one or more transactions on the actual environment.

33. The article of manufacture of claim 25, wherein instructions for executing the one or more triggered handlers comprises executing a cycle of two or more triggered handlers.

34. The article of manufacture of claim 33, wherein the cycle of two or more triggered handlers is detected and reported.

35. The article of manufacture of claim 33, wherein executing a cycle of two or more triggered handlers comprises breaking the cycle of two or more triggered handlers.

* * * * *